US008977884B2

(12) United States Patent
Sridharan et al.

(10) Patent No.: US 8,977,884 B2
(45) Date of Patent: Mar. 10, 2015

(54) SHARED-PLL AUDIO CLOCK RECOVERY IN MULTIMEDIA INTERFACES

(75) Inventors: Sucheendran Sridharan, McMurray, PA (US); Bharadwaj Parthasarathy, Plano, TX (US); James Nave, Denton, TX (US); Haydar Bilhan, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1126 days.

(21) Appl. No.: 12/964,736

(22) Filed: Dec. 9, 2010

(65) Prior Publication Data

US 2012/0147266 A1    Jun. 14, 2012

(51) Int. Cl.
| | | |
|---|---|---|
| G06F 1/00 | (2006.01) |
| H03L 7/06 | (2006.01) |
| H03M 9/00 | (2006.01) |
| H04N 5/12 | (2006.01) |
| H04N 21/43 | (2011.01) |
| H04N 21/4363 | (2011.01) |
| H04N 21/8547 | (2011.01) |

(52) U.S. Cl.
CPC ........... *H04N 5/126* (2013.01); *H04N 21/4305* (2013.01); *H04N 21/43635* (2013.01); *H04N 21/8547* (2013.01)

USPC ............ 713/500; 713/501; 327/147; 341/100

(58) Field of Classification Search
None
See application file for complete search history.

(56) References Cited

U.S. PATENT DOCUMENTS

| | | | | |
|---|---|---|---|---|
| 6,151,076 A * | 11/2000 | Hoffman et al. | ............... | 348/512 |
| 7,088,398 B1 * | 8/2006 | Wolf et al. | ................. | 348/423.1 |
| 7,474,724 B1 * | 1/2009 | Gudmunson et al. | ......... | 375/376 |
| 8,217,689 B2 * | 7/2012 | Yang et al. | .................... | 327/156 |
| 2002/0163598 A1 * | 11/2002 | Pasqualino | .................... | 348/725 |
| 2007/0091935 A1 * | 4/2007 | Yonezawa et al. | ............ | 370/503 |
| 2009/0167366 A1 * | 7/2009 | Wang | ............................ | 327/105 |
| 2011/0075782 A1 * | 3/2011 | Zhang et al. | .................. | 375/376 |
| 2012/0096509 A1 * | 4/2012 | Zeng et al. | .................... | 725/127 |

* cited by examiner

*Primary Examiner* — Ji H Bae
(74) *Attorney, Agent, or Firm* — Robert D. Marshall, Jr.; Frederick J. Telecky, Jr.

(57) ABSTRACT

A bit stream includes playback data having an associated clock rate and a variable reference clock that is synchronized to the bit stream. A playback clock recovery signal and a data recovery signal are generated in response to the received reference clock. A playback clock frequency signal is generated in response to the playback clock recovery signal. A recovered playback clock is generated by using a divide by M divider, wherein the value of M used by the divide by M divider is determined in response to a programmable multiple of the clock rate associated with the playback information.

10 Claims, 6 Drawing Sheets

SHARED-PLL AUDIO CLOCK RECOVERY IN MULTIMEDIA INTERFACES

BACKGROUND

The HDMI (High-Definition Multimedia Interface) standard is a common audio-video interface standard that is used for transmitting digital data used in multimedia devices. A TMDS (Transition Minimized Differential Signaling) signal is used by the HDMI (interface) to convey video, audio, and auxiliary data. When a TMDS signal is received by an HDMI-enabled device, the video and audio data are recovered using a PLL (Phase-Locked Loop). A second PLL is used to generate an audio clock that is used for playback of recovered audio data. The PLLs often consume substantial amounts of power to operate and require substantial area in a substrate of an integrated circuit to implement, and also have special layout and electrical requirements that increase the cost of an integrated circuit used to perform the data recovery.

SUMMARY

The problems noted above are solved in large by recovering an audio clock (MCLK) without requiring the use of a second single-purpose PLL. As disclosed herein, a bit stream includes playback data having an associated clock rate and a variable reference clock that is synchronized to the bit stream. A playback clock recovery signal and a data recovery signal are generated in response to the received reference clock. A playback clock frequency signal is generated in response to the playback clock recovery signal. A recovered playback clock is generated by using a divide by M divider, wherein the value of M used by the divide by M divider is determined in response to a programmable multiple of the clock rate associated with the playback information. The recovered data (such as audio information) is played back using the recovered playback clock.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular system components. As one skilled in the art will appreciate, various names can be used to refer to a component. Accordingly, distinctions are not necessarily made herein between components that differ in name but not function. In the following discussion and in the claims, the terms "including" and "comprising" are used in an open-ended fashion, and thus are to be interpreted to mean "including, but not limited to . . . ." Also, the terms "coupled to" or "couples with" (and the like) are intended to describe either an indirect or direct electrical connection. Thus, if a first device couples to a second device, that connection can be through a direct electrical connection, or through an indirect electrical connection via other devices and connections.

Figure 1:
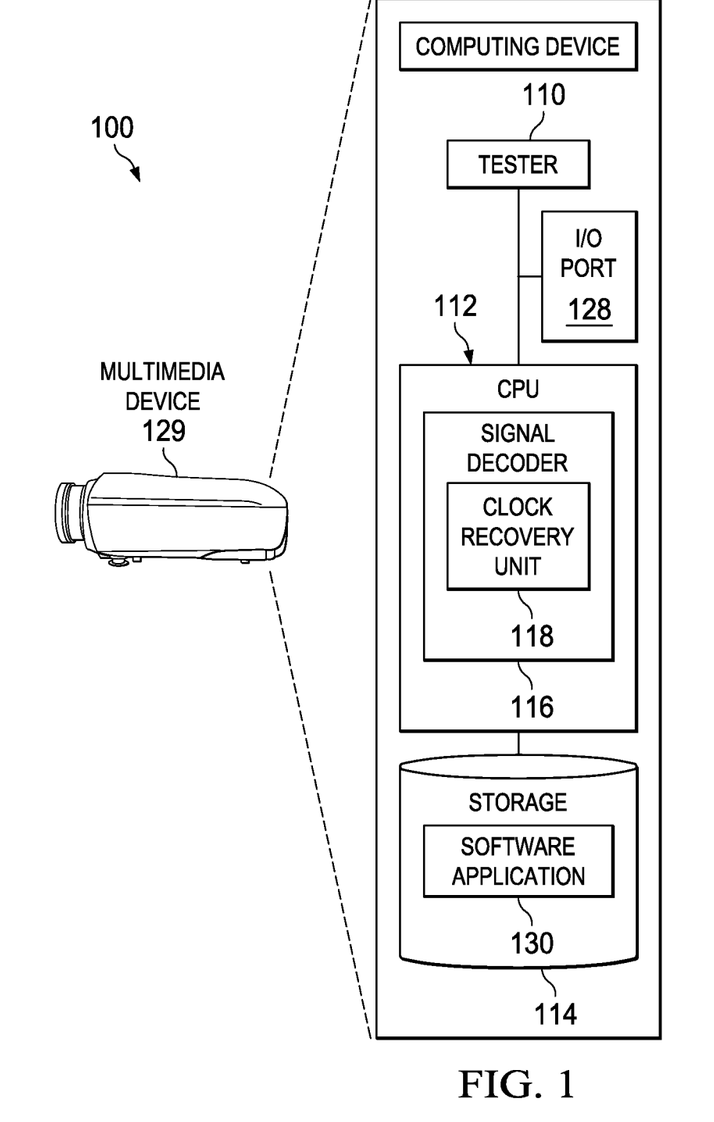
FIG. 1 shows an illustrative computing device 100 in accordance with embodiments of the disclosure.

FIG. 1 shows an illustrative computing device 100 in accordance with embodiments of the disclosure. The computing device 100 is, or is incorporated into, a multimedia device 129, such as a video projector, a home theater system, a computer monitor with amplified speakers, a personal digital assistant (e.g., a BLACKBERRY® device), a personal computer, automotive electronics, or any other type of electronic system.

In some embodiments, the computing device 100 comprises a megacell or a system-on-chip (SoC) which includes control logic such as a CPU 112 (Central Processing Unit), a storage 114 (e.g., random access memory (RAM)) and tester 110. The CPU 112 can be, for example, a CISC-type (Complex Instruction Set Computer) CPU, RISC-type CPU (Reduced Instruction Set Computer), or a digital signal processor (DSP). The storage 114 (which can be memory such as RAM or disk storage) stores one or more software applications 130 (e.g., embedded applications) that, when executed by the CPU 112, perform any suitable function associated with the computing device 100. The tester 110 comprises logic that supports testing and debugging of the computing device 100 executing the software application 130. For example, the tester 110 can be used to emulate a defective or unavailable component(s) of the computing device 100 to allow verification of how the component(s), were it actually present on the computing device 100, would perform in various situations (e.g., how the component(s) would interact with the software application 130). In this way, the software application 130 can be debugged in an environment which resembles post-production operation.

The CPU 112 typically comprises memory and logic which store information frequently accessed from the storage 114. The CPU 112 is arranged to control and/or implement the functions of the HDMI decoder 116 and the clock recovery unit 118, which are used during the execution the software application 130. The CPU 112 is coupled to I/O (Input/Output) port 128, which provides an interface that is configured to receive input from (and/or provide output to) peripherals and/or computing devices, including tangible media (such as "flash" type memory) and/or cabled or wireless media.

Thus, the disclosed computing device 100 is arranged to receive ("sink") an HDMI signal and recover data encoded within the HDMI signal for audiovisual playback using multimedia device 129 (in which the computing device 100 may be incorporated). For example, the audio visual playback presents recovered audio data (e.g., using an audio amplifier) that is synchronized to a presentation of the recovered video data (e.g., using a digital light projector) from the bit stream. The HDMI signal includes a bit stream includes information (both audio and video) that is encoded in accordance with a "video" format, although that video format includes reserved time slots, for example, for conveying other information, such as audio information. As disclosed herein, audio data in the HDMI signal can be recovered and played-back using a clock derived from information received in a portion of the HDMI signal used for video transmission.

Figure 2:
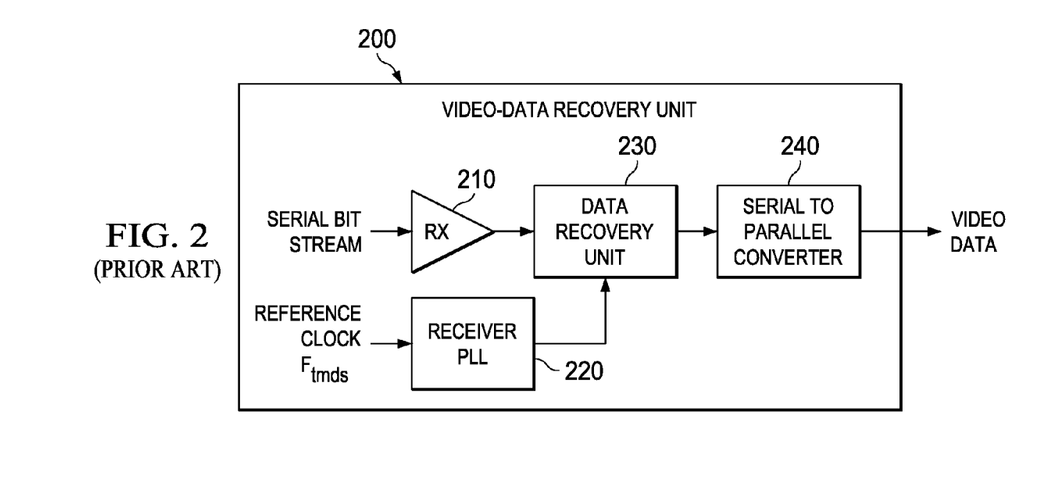
FIG. 2 is a schematic diagram illustrating a conventional video-data recovery unit.

FIG. 2 is a schematic diagram illustrating a conventional video-data recovery unit. A serial bit stream and a reference clock (for clocking the bit stream) is received by a video-data recovery unit 200 that recovers data from the serial bit stream. (As mentioned above, the "video" data has reserved time slots for carrying audio information: the timing of the data provides a context for determining whether the recovered data is to be actually used for audio or video playback). A receiver (RX) 210 receives the serial bit stream and produces a buffered output signal in response. A receiver PLL (phase locked loop) 220 receives the reference clock ($F_{TMDS}$) and generates a clock in response to the received reference clock.

The data recovery unit 230 produces recovered data by sampling the buffered output signal generated by the receiver 210. The buffered output signal is sampled in response to the clock generated by receiver PLL 220. The data recovery unit 230 outputs the recovered data, which is deserialized by the serial to parallel converter 240. The deserialized recovered data includes, for example, video-data for driving a display.

Figure 3:
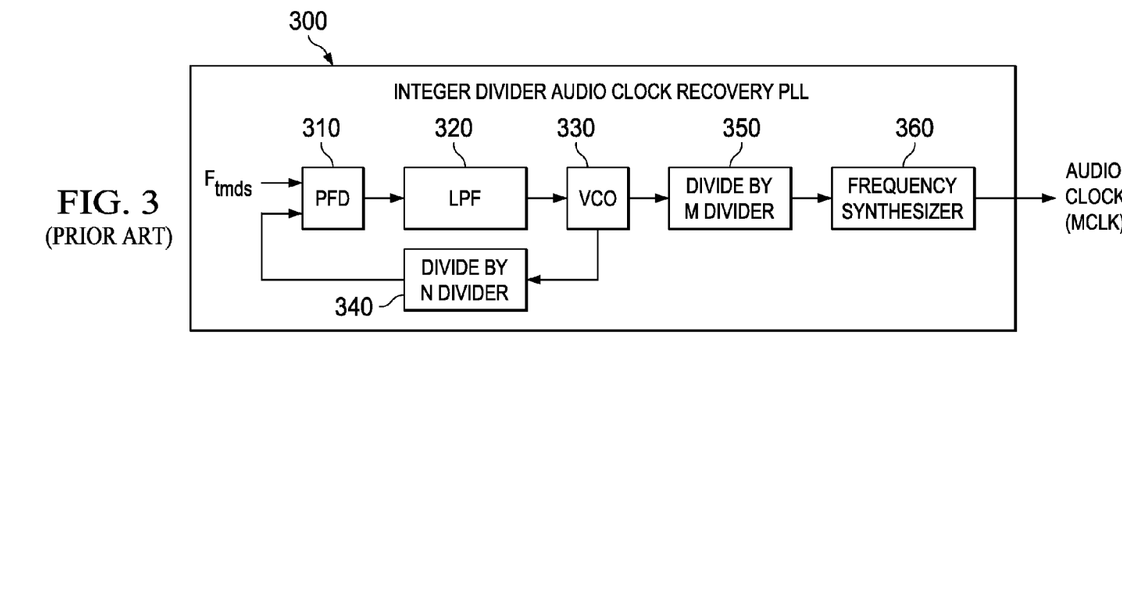
FIG. 3 is a schematic diagram illustrating a conventional integer divider audio clock recovery PLL.

FIG. 3 is a schematic diagram illustrating a conventional integer divider audio clock recovery PLL. The integer divider audio clock recovery PLL 300 forms a phase locked loop for generating an audio clock (MCLK) in response to the received reference clock ($F_{TMDS}$). A serial bit stream and a phase correction signal is received by a phase frequency detector 310. In response to the received serial bit stream and the phase correction signal, the phase frequency detector 310 outputs an error signal that reflects phase differences between the two input signals.

The low pass filter (LPF) 320 produces a filtered error signal that is used to control the voltage controlled oscillator (VCO) 330. The voltage controlled oscillator generates an output frequency, which is coupled to the divide by N divider 340. The divide by N divider 340 generates the phase correction signal that is received by a phase frequency detector 310 (thus completing the feedback loop for controlling the integer divider audio clock recovery PLL 300).

The voltage controlled oscillator also generates an output frequency, which is coupled to the divide by M divider 340. The divide by M divider 340 generates a lowered frequency signal that is received by a frequency synthesizer 360. In response to the lowered frequency signal the frequency synthesizer generates an audio clock (MCLK), which is arranged to clock received audio data for playback.

Figure 4:
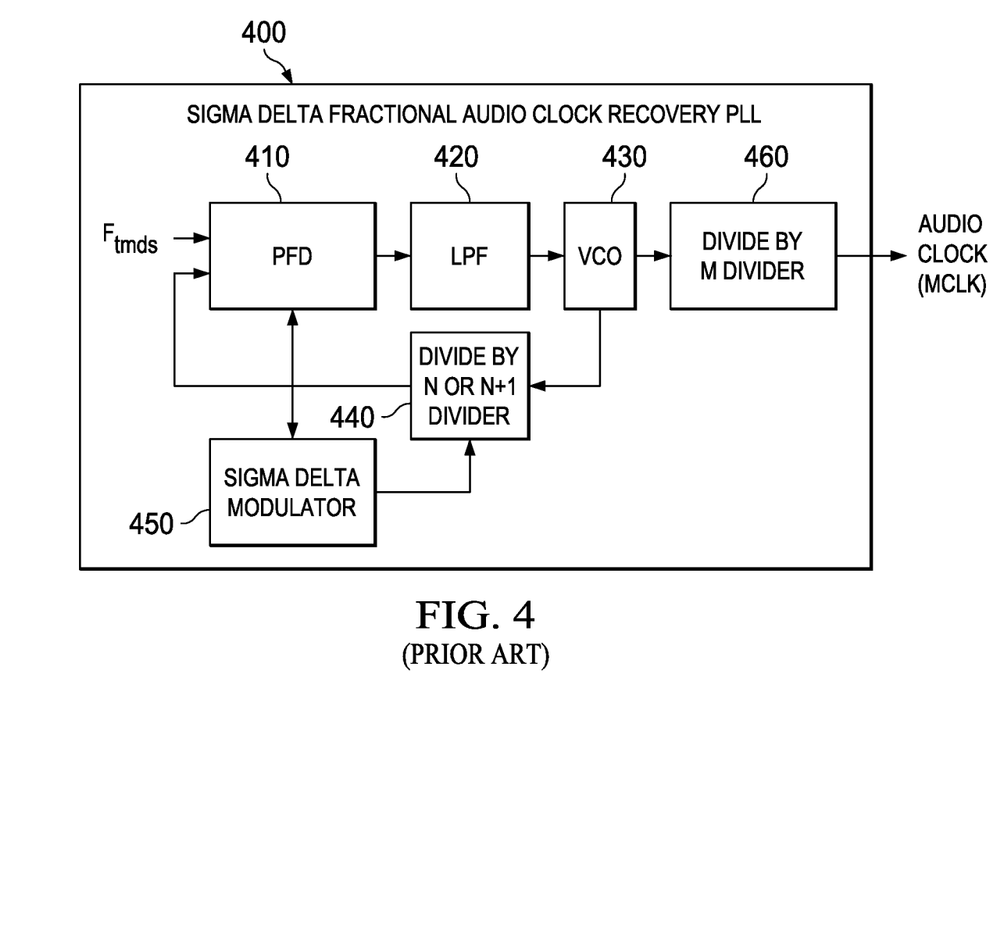
FIG. 4 is a schematic diagram illustrating a conventional sigma delta fractional audio clock recovery PLL.

FIG. 4 is a schematic diagram illustrating a conventional sigma delta fractional audio clock recovery PLL. The sigma delta fractional audio clock recovery PLL 400 forms a phase locked loop for generating an audio clock (MCLK) in response to the received reference clock ($F_{TMDS}$). A serial bit stream and a phase correction signal is received by a phase frequency detector 410. In response to the received serial bit stream and the phase correction signal, the phase frequency detector 410 outputs an error signal that reflects phase differences between the two input signals.

The low pass filter (LPF) 420 produces a filtered error signal that is used to control the voltage controlled oscillator (VCO) 430. The voltage controlled oscillator generates an output frequency, which is coupled to the divide by N divider 440. The divide by N divider 440 generates the phase correction signal that is received by a phase frequency detector 410. The divide by N divider 440 generates the phase correction signal by dividing the voltage controlled oscillator 430 output frequency by either N or N+1 as determined by sigma delta modulator 450. Sigma delta modulator 450 determines which of N or N+1 to use as an integer divisor in response to information communicated between the sigma delta modulator 450 and the phase frequency detector 410.

The voltage controlled oscillator also generates an output frequency, which is coupled to the divide by M divider 460. The divide by M divider 460 generates a lowered frequency signal that is that is used as an audio clock (MCLK), which is arranged to clock audio data received from the bit stream for playback.

Figure 5:
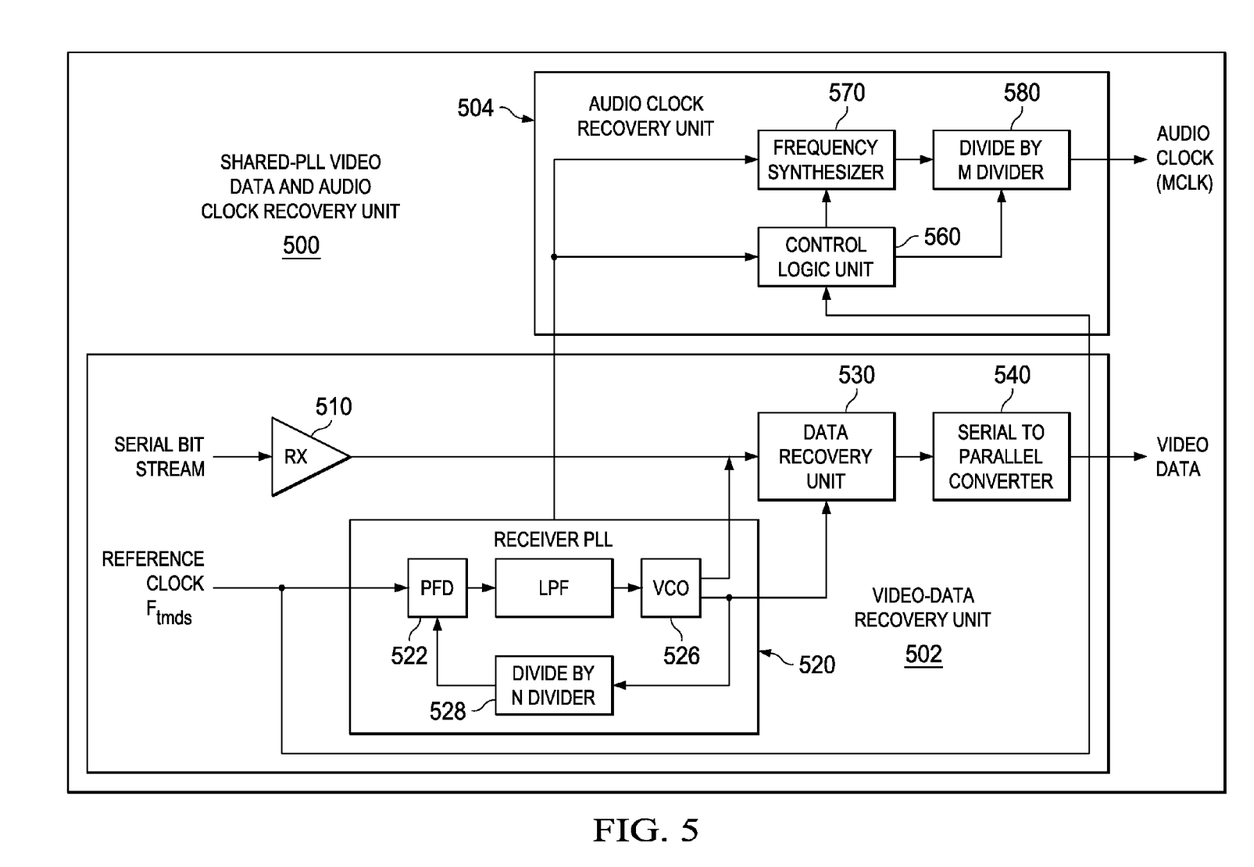
FIG. 5 is a schematic diagram illustrating a shared-PLL video data and audio clock recovery unit in accordance with embodiments of the disclosure.

FIG. 5 is a schematic diagram illustrating a shared-PLL video data and audio clock recovery unit in accordance with embodiments of the disclosure. The shared-PLL video data and audio clock recovery unit 500 includes a serial data recovery unit 502 and audio clock recovery unit 504. A serial bit stream and a reference clock (used to clock the bit stream) is received by the shared-PLL video data and audio clock recovery unit 500 that recovers audio and video data from the serial bit stream. As discussed below, the audio clock recovery unit 504 uses timing information derived from a PLL of the serial data recovery unit 502 to generate an audio clock for playback of recovered audio information.

For serial bit stream applications using HDMI, the audio and video data are encoded (e.g., by a source of data to be sent across an HDMI link) into a single bit stream based on relationships between the video and audio clocks defined by the HDMI standard. The serial bit stream is transmitted along with a reference clock ($F_{TMDS}$) to a receiver to recover the video and audio data of the bit stream. The HDMI specification specifies the relationship between the reference clock ($F_{TMDS}$) and the audio clock (MCLK).

The relationship between the (master) audio clock (MCLK) and the reference clock ($F_{TMDS}$) can be defined as:

$$MCLK = K * F_{audio} = \frac{F_{tmds} * N * K}{CTS}, \qquad [\text{I}]$$

where K is an audio rate multiplier selected from the group of integers including 1, 2, 3, 4, 6, and 8, and where N is (is an input value defined in the HDMI Audio Clock Regeneration Packet) ranging from:

$$\frac{F_{audio}}{1500 \text{ Hz}} \leq N \leq \frac{F_{audio}}{300 \text{ Hz}}, \qquad [\text{II}]$$

where CTS (cycle time stamp defined in the Audio Clock Regeneration Packet) has a value recommended in the HDMI standard (such as in tables 7-1, 7-2, and 7-3 of the HDMI 3.1 specification) that is selected in conjunction with the value of N. The values of N and CTS are transmitted across the HDMI link by the source of the HDMI-encoded data to the receiver ("sink") of the HDMI-encoded data. $F_{TDMS}$ is the reference video clock frequency of the receiver PLL.

The value of K is an audio rate multiplier that is specified as the ratio of the clock rate (e.g., bandwidth) of the recovered audio information to an internal audio clock speed (which, for example, allows processing of the recovered audio data at clock rates up to eight times the clock rate associated with the input audio signal). Conventional solutions provided a separate (from the PLL tasked with receiving the "video" portion of the serial bit stream), dedicated PLL for a predefined value of K. As disclosed herein, the value of K is programmable, which allows for a variety of multiples of the (original) clock rate to be used when processing the recovered audio information. Allowing the value of K to be determined, (for example, in response to a video format associated with a serial bit stream that is to be processed) allows flexibility in providing customized solutions that are optimal for a particular video format for the serial bit stream.

Standards such as HDMI often incorporate various (including legacy) formats for imbedded data. By allowing K to be determined in response to any given format allows (for example) optimal processing and playback algorithms to be selected and used for playback of any of a variety of audio signal formats. Accordingly, the value of K (and thus M) can be selected in selected in response to an identification of an audiovisual format that is used to format the received bit stream. The type of the audiovisual format can be received from the source of the bit stream. The value K can thus be programmed to provide an audio clock that has a frequency that is a multiple of the clock rate associated with the audio information. The frequency can be an integer or real (e.g., represented using fixed point notation) multiple of the clock rate associated with the audio information.

The serial data recovery unit 502 includes a receiver (RX) 510 receives the serial bit stream and produces a buffered output signal in response. The receiver PLL (phase locked loop) 520 receives the reference clock ($F_{Ds}$) and generates an audio clock recovery signal and a data recovery signal in response to the received reference clock.

A serial bit stream and a phase correction signal is received by a phase frequency detector 522 of receiver PLL 520. In response to the received serial bit stream and the phase correction signal, the phase frequency detector 522 outputs an error signal that reflects phase differences between the two input signals. The low pass filter (LPF) 524 produces a filtered error signal that is used to control the voltage controlled oscillator (VCO) 526. The voltage controlled oscillator 526 generates an output frequency, which is coupled to the divide by N divider 528. The divide by N divider 528 (using the value of N) generates the phase correction signal that is received by a phase frequency detector 522 (thus completing the feedback loop for controlling the receiver PLL 520).

The audio clock recovery signal may have a frequency that is different from or is the same as the data recovery signal in order to (for example) more effectively clock components that are driven by the clocks. However, both the audio clock recovery signal and the data recovery signal are synchronized with respect to a phase of the received reference clock (which may vary in frequency and phase jitter). The audio clock recovery signal is used to drive the components (discussed below) of the audio clock recovery unit 504, whereas the data recovery signal is used to drive the data recovery unit 530 of the serial data recovery unit 502.

The data recovery unit 530 produces recovered data by sampling the buffered output signal generated by the receiver 510. The recovered data can include both video and audio data, although other types of data are possible. The audio data has an associated clock rate at which, for example, the audio data can be played back. The buffered output signal is sampled in response to the data recovery signal generated by receiver PLL 520. The data recovery unit 530 outputs the recovered data, which is deserialized by the serial to parallel converter 540. The deserialized recovered data includes, for example, video data for driving a display. For example, the HDMI specification specifies separate kinds of intervals with in a video frame that are used for the purpose of transmitting either video or audio information.

The audio clock recovery unit 504 receives the reference clock and the audio clock recovery signal generated by the receiver PLL 520 and generates an audio clock for synchronized playback of audio data recovered from the serial bit stream. The control logic unit 560 of the audio clock recovery unit 504 receives the reference clock and the audio clock recovery signal to generate an audio clock frequency control signal and a post frequency synthesis control signal. The control logic unit 560 uses digital circuitry to generate the audio clock frequency control signal and the post frequency synthesis control signal as further discussed below.

The frequency synthesizer 570 receives the audio clock frequency control signal generated by the receiver PLL 520 and the audio clock frequency control signal generated by the control logic unit 560 to generate an audio clock frequency signal. Using the frequency synthesizer 570 allows an audio clock frequency signal to be generated that, for example, is not an integer multiple of the audio clock frequency control signal.

The divide by M divider 580 (using the value of M) receives the audio clock frequency signal and the post frequency synthesis control signal and, in response, generates the audio clock for playback of audio data recovered from the serial bit stream. The post frequency synthesis control signal conveys, for example, the value for M to be used by the divide by M divider 580.

As mentioned above, the shared-PLL video data and audio clock recovery unit 500 avoids the use a (second) dedicated PLL. The functionality formerly provided by the second dedicated PLL is transferred to the control logic unit 560 driving the frequency synthesizer 570 and the divide by M divider 580. The programmable logic circuits used to generate the controls for the frequency synthesizer can be much smaller and straightforward as compared to the using a PLL that is solely dedicated for producing the audio clock.

The audio clock is generated under the control of the control logic unit 560 in accordance with the following equations:

$$F_{tmds} = \frac{F_{vco}}{N_{pll}} \qquad [III]$$

where $N_{pll}$ is the feedback divider ratio for the receiver PLL ($F_{VCO}/F_{TMDS}$) (e.g., the value of N for the divide by N divider 528 in the receiver PLL 520), and where $F_{vco}$ is the frequency of the VCO 526 in the receiver PLL 520. For example, a VCO having an $F_{vco}$ of five times greater than the reference clock ($F_{TMDS}$) would have an $N_{PLL}$ of five.

Rearranging Equation I yields:

$$MCLK = \left(\frac{N}{CTS}\right) * (F_{tmds}) * K \qquad [IV]$$

Substituting the term "$F_{TMDS}$" in Equation IV using Equation III yields:

$$MCLK = \left(\frac{N}{CTS}\right) * \left(\frac{F_{vco}}{N_{pll}}\right) * K \qquad [V]$$

Accordingly, the audio clock (MCLK) can be determined in response to the (serial input bit stream) reference clock "$F_{TMDS}$" and parameters determined from selecting a format used to transfer data in the serial input bit stream.

Figure 6A:
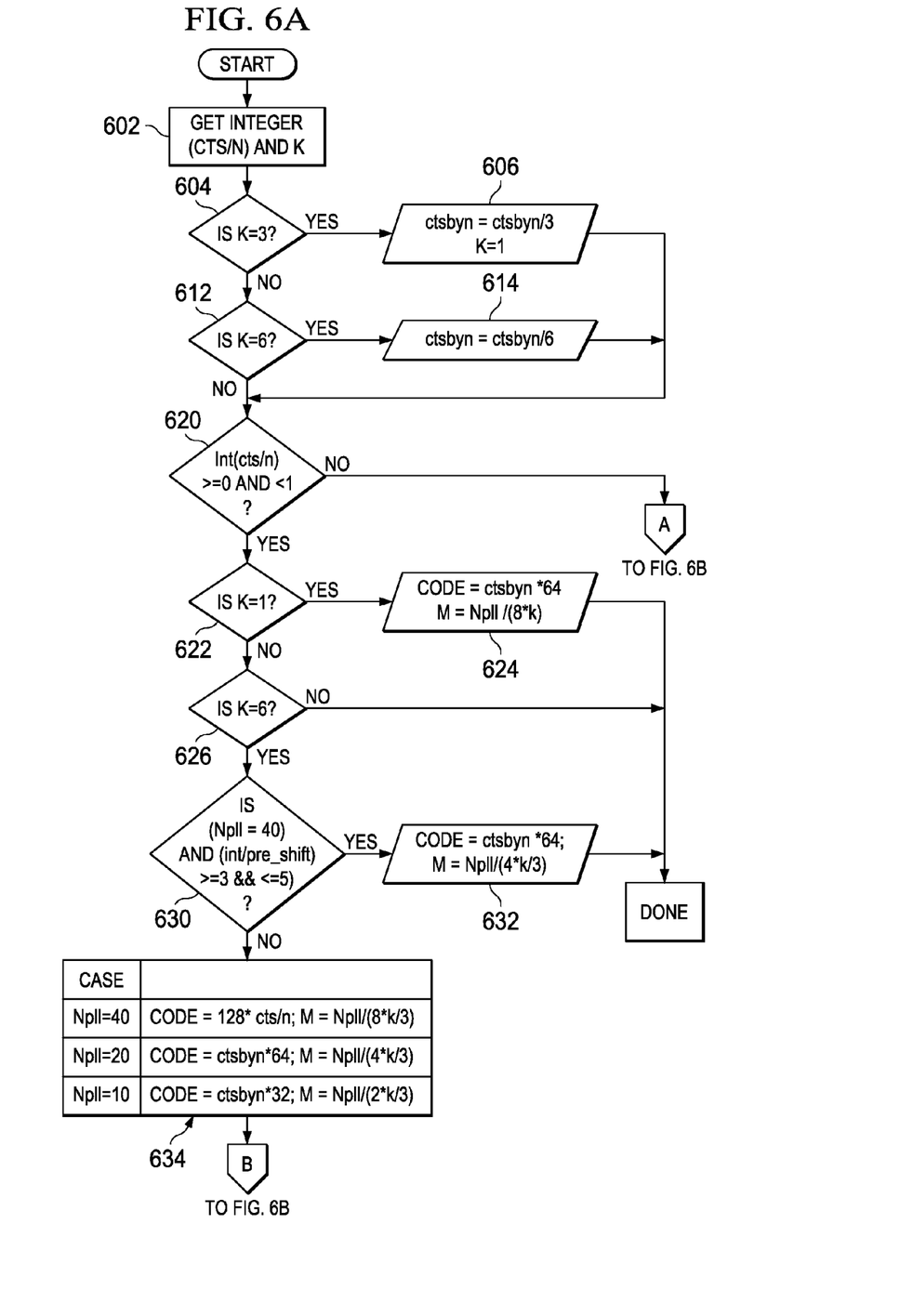
FIGS. 6A and 6B are together a flow diagram illustrating a process for determining post synthesis divisor in accordance with embodiments of the present disclosure.
Figure 6B:
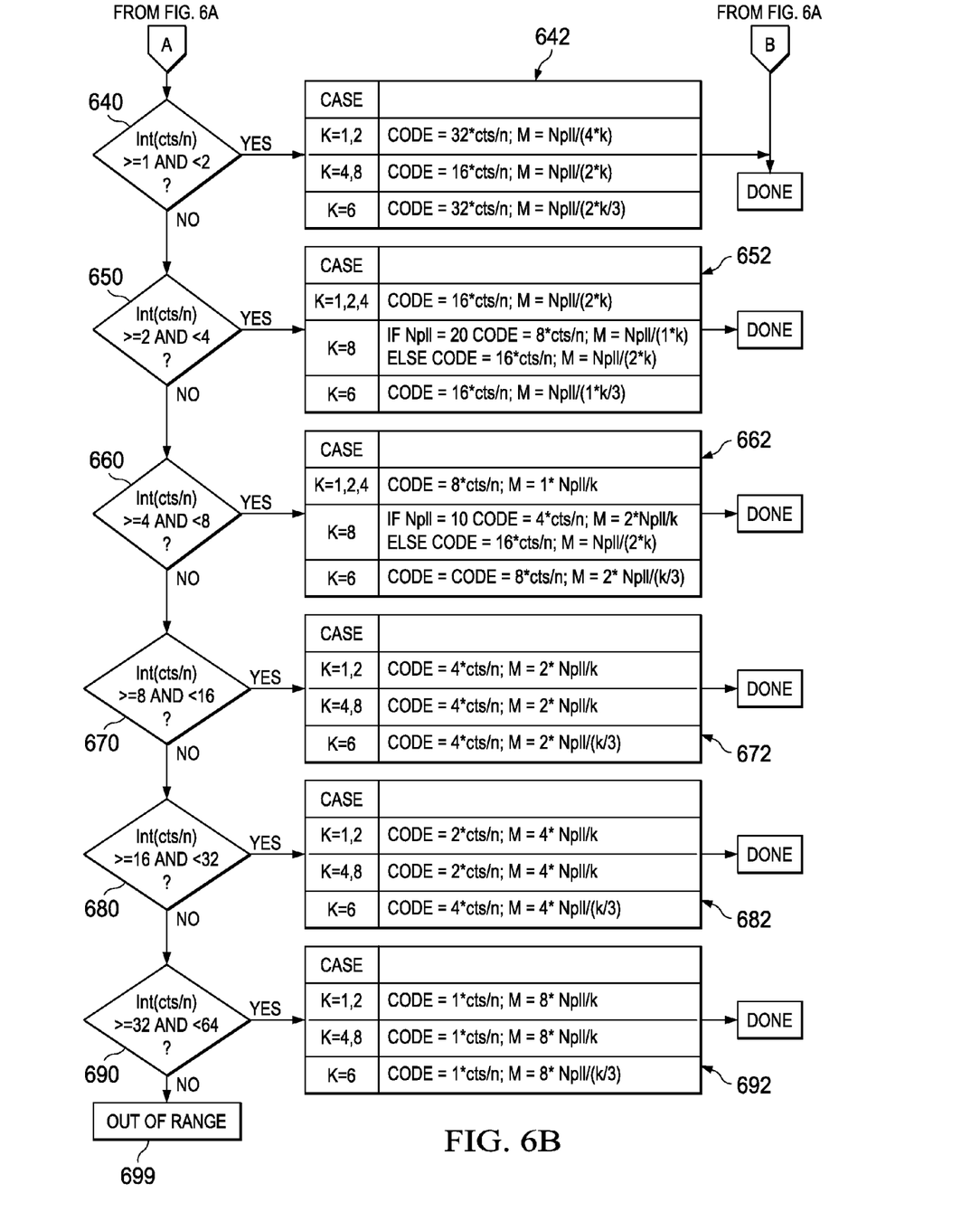

FIG. 6 is FIGS. 6A and 6B together are a flow diagram illustrating a process for determining post synthesis divisor in accordance with embodiments of the present disclosure. Process 600 starts at block 602 where values for CTS, N and K (which is the audio rate multiplier) are received. Variable ctsbyn (which specifies CTS/N) is initialized using the integer ratio of CTS to N. (The function "int" returns the integer portion of a real number.) In block 604, K is evaluated: if K=3, the program flow proceeds to block 606, else the program flow proceeds to block 612. In block 606, ctsbyn is divided by 3, K is assigned the value of 1, and the program flow ends. In block 612, K is evaluated: if K=6, program flow proceeds to block 614, else the program flow proceeds to block 620. In block 614, ctsbyn is divided by 6, and the program flow proceeds to block 620.

In block 620, the integer ratio of CTS to N is evaluated, and when the expression "0>=int(CTS/N)>1" is true ("Y"), the program flow proceeds to block 622, else the program flow proceeds to block 640 (FIG. 6B). In block 622, K is evaluated: if K=1, program flow proceeds to block 624, else the program flow proceeds to block 626. In block 624, the variable "code" is assigned the result of "ctsbyn*64," M is assigned the value of "Npll/(8*K)" and the program flow ends. The variable "code" is used in an embodiment to program the frequency output by the frequency synthesizer 570.

In block 626, K is evaluated: if K=6, program flow proceeds to block 630, else the program flow ends. In block 630, the expression ((Npll=40) AND (int(pre_shift)>=3 && <=5)) is evaluated: if true, the process proceeds to block 632, else the program flow proceeds to block 634. (The parameter "pre_shift" is used to convey the initialization state of the frequency synthesizer 570 in an embodiment.) In block 632, the variable "code" is assigned the result of "ctsbyn*64," and M is assigned the value of "N/(4*K/3)" (where the multiplication and division operators have the same level of operator precedence and is evaluated left-to-right), and the program flow ends.

In block 634, a case statement is evaluated: if Npll=40 then "code" is assigned the value of "128*cts/n" and M is assigned the value of "Npll/(8*k/3);" if Npll=20 then "code" is assigned the value of "ctsbyn*64" and M is assigned the value of "Npll/(4*k/3);" and if Npll=10 then "code" is assigned the value of "ctsbyn*32" and M is assigned the value of "Npll/(2*k/3)." After the case statement of block 634 is executed, the program flow ends (FIG. 6B).

In block 640, the integer ratio of CTS to N is evaluated, and when the expression "1>=int(CTS/N)>2" is true, the program flow proceeds to block 642, else the program flow proceeds to block 650. In block 642, a case statement is evaluated: if K=1.2 (e.g., K=1 or K=2), "code" is assigned the value of "32*cts/n" and M is assigned the value of "Npll/(4*k);" if K=4.8, "code" is assigned the value of "16*cts/n" and M is assigned the value of "Npll/(2*k);" and if K=6 then "code" is assigned the value of "32*cts/n" and M is assigned the value of "Npll/(2*k/3)." After the case statement of block 642 is executed, the program flow ends.

In block 650, the integer ratio of CTS to N is evaluated, and when the expression "2>=int(CTS/N)>4" is true, the program flow proceeds to block 652, else the program flow proceeds to block 660. In block 652, a case statement is evaluated: if K=1.2, 4, "code" is assigned the value of "16*cts/n" and M is assigned the value of "Npll/(2*k);" if K=8, and if Npll=20 then "code" is assigned the value of "8*cts/n" and M is assigned the value of "Npll/(1*k) and if Npll≠20 then "code" is assigned the value of "16*cts/n" and M is assigned the value of "Npll/(2*k);" and if K=6 then "code" is assigned the value of "16*cts/n" and M is assigned the value of "Npll/(1*k/3)." After the case statement of block 652 is executed, the program flow ends.

In block 660, the integer ratio of CTS to N is evaluated, and when the expression "4>=int(CTS/N)>8" is true, the program flow proceeds to block 662, else the program flow proceeds to block 670. In block 662, a case statement is evaluated: if K=1.2, 4, "code" is assigned the value of "8*cts/n" and M is assigned the value of "1*Npll/k;" if K=8, and if Npll=10 then "code" is assigned the value of "4*cts/n" and M is assigned the value of "2*Npll/k and if Npll≠10 then "code" is assigned the value of "8*cts/n" and M is assigned the value of "1*Npll/k;" and if K=6 then "code" is assigned the value of "8*cts/n" and M is assigned the value of "2*Npll/(k/3)." After the case statement of block 662 is executed, the program flow ends.

In block 670, the integer ratio of CTS to N is evaluated, and when the expression "8>=int(CTS/N)>16" is true, the program flow proceeds to block 672, else the program flow proceeds to block 680. In block 672, a case statement is evaluated: if K=1.2, "code" is assigned the value of "4*cts/n" and M is assigned the value of "2*Npll/k;" if K=4.8, "code" is assigned the value of "4*cts/n" and M is assigned the value of "2*Npll/k;" and if K=6 then "code" is assigned the value of "4*cts/n" and M is assigned the value of "2*Npll/(k/3)." After the case statement of block 672 is executed, the program flow ends.

In block 680, the integer ratio of CTS to N is evaluated, and when the expression "16>=int(CTS/N)>32" is true, the program flow proceeds to block 682, else the program flow proceeds to block 690. In block 682, a case statement is evaluated: if K=1.2, "code" is assigned the value of "2*cts/n" and M is assigned the value of "4*Npll/k;" if K=4.8, "code" is assigned the value of "2*cts/n" and M is assigned the value of "4*Npll/k;" and if K=6 then "code" is assigned the value of "4*cts/n" and M is assigned the value of "4*Npll/(k/3)." After the case statement of block 682 is executed, the program flow ends.

In block 690, the integer ratio of CTS to N is evaluated, and when the expression "32>=int(CTS/N)>64" is true, the program flow proceeds to block 692, else the program flow proceeds to block 699 (where the integer ration would be out of range and error processing employed). In block 692, a case statement is evaluated: if K=1.2, "code" is assigned the value of "1*cts/n" and M is assigned the value of "8*Npll/k;" if K=4.8, "code" is assigned the value of "1*cts/n" and M is assigned the value of "8*Npll/k;" and if K=6 then "code" is assigned the value of "1*cts/n" and M is assigned the value of "8*Npll/(k/3)." After the case statement of block 692 is executed, the program flow ends.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A circuit for recovering a clock from a transmitted signal, comprising:
   a serial data recovery unit arranged to receive a bit stream that includes video information and audio information having an associated clock rate, to receive a variable reference clock that is synchronized to the bit stream, and to use a phase lock loop (PLL) having a divide by N divider to generate an audio clock recovery signal and a data recovery signal in response to the received reference clock; and
   an audio clock recovery unit arranged to receive the audio clock recovery signal, to generate an audio clock frequency signal in response to the audio clock recovery signal, and to generate a recovered clock by using a divide by M divider, wherein the value of M used by the divide by M divider is determined in response to a programmable multiple of the clock rate associated with the audio information.

2. The circuit of claim 1, wherein the serial data recovery unit is arranged to recover data from the bit stream using the data recovery signal to latch data from the bit stream.

3. The circuit of claim 1, wherein the value of M is determined in response to the value of N used by the divide by N divider.

4. The circuit of claim 1, wherein the audio clock frequency signal is generated by a frequency synthesizer that is not a PLL.

5. The circuit of claim 1, wherein the value of M is determined by a ratio of the clock rate associated with the audio information to the frequency of the reference clock.

6. The circuit of claim 5, wherein the value of the ratio of the clock rate associated with the audio information to the frequency of the reference clock is received from a source of the bit stream and the reference clock.

7. The circuit of claim 1, wherein the bit stream and the reference clock are transmitted across an HDMI link.

8. The circuit of claim 1, wherein the value of the programmable multiple of the clock rate associated with the audio information is selected in response to an identification of an audiovisual format that is used to format the bit stream.

9. The circuit of claim 1, wherein the value of M is selected in response to a ratio of the frequency of a voltage controlled oscillator (VCO) of the serial data recovery unit PLL to value of N used by the divide by N divider.

10. The circuit of claim 1, wherein the value of M is selected in response to the frequency of a voltage controlled oscillator (VCO) of the serial data recovery unit PLL.

* * * * *